United States Patent
Reddy et al.

(10) Patent No.: US 12,463,700 B2
(45) Date of Patent: Nov. 4, 2025

(54) METHOD AND APPARATUS FOR MULTI-ACCESS UPLINK TRANSMISSION OF DIFFERENT WAVEFORMS

(71) Applicant: Indian Institute Of Technology Kharagpur, Kharagpur (IN)

(72) Inventors: B.V. Sudhakar Reddy, Kharagpur (IN); Chaithanya Velampalli, Kharagpur (IN); Suvra Das, Kharagpur (IN)

(73) Assignee: Indian Institute of Technology Kharagpur, Kharagpur (IN)

( * ) Notice: Subject to any disclaimer, the term of this patent is extended or adjusted under 35 U.S.C. 154(b) by 76 days.

(21) Appl. No.: 18/596,855

(22) Filed: Mar. 6, 2024

(65) Prior Publication Data
US 2025/0183974 A1    Jun. 5, 2025

(30) Foreign Application Priority Data
Dec. 2, 2023    (IN) .............................. 202331082161

(51) Int. Cl.
*H04L 5/12*    (2006.01)
*H04B 7/0404*    (2017.01)
*H04B 7/06*    (2006.01)

(52) U.S. Cl.
CPC ......... *H04B 7/0639* (2013.01); *H04B 7/0404* (2013.01); *H04B 7/0678* (2013.01)

(58) Field of Classification Search
CPC .. H04B 7/0639; H04B 7/0404; H04B 7/0678; H04L 5/0023; H04L 27/2647; H04L 5/0048
USPC ................ 375/262, 260, 259, 219, 295, 316
See application file for complete search history.

(56) References Cited

U.S. PATENT DOCUMENTS

2019/0081836 A1*    3/2019    Hadani ................. H04L 5/0023

* cited by examiner

*Primary Examiner* — Zewdu A Kassa
(74) *Attorney, Agent, or Firm* — Kevin J Fournier Intellectual Property Legal Services Ltd.; Kevin J Fournier

(57) ABSTRACT

Provided is a multi-access method (500, 600) and a communication apparatus (102) for uplink transmission of different waveforms. The method (500) comprises receiving (502) an allocation of one or more indices for a respective users for uplink transmission of modulated symbols. The method further comprising transforming (504) the modulated symbols using a first matrix (P) for each index among the one or more indices. Furthermore, the method comprises generating (506) discrete-time signals by upsampling by a factor of plurality of indices by stuffing one or more zeroes, and circularly shifting the upsampled symbols. The method further comprises transmitting (508) uplink signals by combining the generated discrete-time signals of each user for the allocated one or more indices.

14 Claims, 8 Drawing Sheets

$$\begin{bmatrix} \updownarrow & \updownarrow & \updownarrow & \updownarrow \\ h_{1,0} & h_{1,1} & h_{1,2} & h_{1,3} \\ \downarrow & \downarrow & \downarrow & \downarrow \end{bmatrix} \begin{bmatrix} s_1[0] \\ 0 \\ s_1[2] \\ 0 \end{bmatrix} + \begin{bmatrix} \updownarrow & \updownarrow & \updownarrow & \updownarrow \\ h_{2,0} & h_{2,1} & h_{2,2} & h_{2,3} \\ \downarrow & \downarrow & \downarrow & \downarrow \end{bmatrix} \begin{bmatrix} 0 \\ s_2[1] \\ 0 \\ s_2[3] \end{bmatrix}$$

$$H_1 \qquad s_1 \qquad H_2 \qquad s_2$$

$$= \begin{bmatrix} \updownarrow & \updownarrow & \updownarrow & \updownarrow \\ h_{1,0} & h_{2,1} & h_{1,2} & h_{2,3} \\ \downarrow & \downarrow & \downarrow & \downarrow \end{bmatrix} \begin{bmatrix} s_1[0] \\ s_2[1] \\ s_1[2] \\ s_2[3] \end{bmatrix}$$

$$H_{eff} \qquad SMU$$

FIG. 4

METHOD AND APPARATUS FOR MULTI-ACCESS UPLINK TRANSMISSION OF DIFFERENT WAVEFORMS

CROSS REFERENCE

This non-provisional convention application claims priority of Indian Patent Application number 202331082161, filed on Dec. 2, 2023, and hereby claims the benefit of the embodiments therein and of the filing date thereof.

FIELD OF INVENTION

The present disclosure relates to a wireless communication. Particularly, but not exclusively, the present disclosure is directed toward a method and a communication apparatus for multi-access uplink transmission of different waveforms from a plurality of users.

BACKGROUND OF THE INVENTION

Continual technological advancement in wireless technology is a need of the hour due to demand for higher data rates, lower latency, and more reliable connectivity to each user. In wireless technology, waveforms evolved from Second Generation (2G) to Fifth Generation (5G) to meet the technological advancement in digital sector. Further, standardization of Sixth Generation (6G) is also taking place to provide more data rates and lower latency to meet autonomous vehicles and intelligent transportation, Internet of Things (IoT) devices, advanced healthcare, etc.

In 5G, an Orthogonal Frequency-Division Multiple Access (OFDMA) multi-access mechanism is based on an OFDM technology. The OFDMA divides the available frequency spectrum into multiple subcarriers. Each subcarrier is orthogonal to the other, thus, the subcarriers do not interfere with each other. Therefore, each subcarrier among the subcarriers allows simultaneous transmission of multiple user data streams in parallel. However, the OFDM suffers from inter-carrier interference in high-mobility scenarios and has a high Peak-to-Average Power Ratio (PAPR). Therefore, the OFDM increases power consumption of a user device. To overcome said challenges, an Orthogonal Time Frequency Space (OTFS) waveform has been introduced recently.

In the OTFS waveform, Quadrature Amplitude Modulation (QAM) symbols including information for transmitting are arranged in a two-dimensional (2D) delay-Doppler (de-Do) domain (grid) instead of a time-frequency (TF) domain as being arranged in the OFDM waveform. Although the OTFS technology has been proposed, an efficient and effective multi-access scheme for the OTFS in uplink transmission for multiple users has not yet been disclosed in any of the conventional techniques relating to the OTFS waveform.

According to a patent literature U.S. Pat. No. 10,090,973B2, multi-access methods for OTFS have been proposed. However, the method requires users to generate an entire OTFS frame for transmission, irrespective of the allocation size of resources. Further, the generated OTFS frame is required to be transmitted by the OFDM transmitter, which increases the complexity of the method.

According to another patent literature U.S. Pat. No. 9,722,741B1, users perform multiplexing in delay domain or Doppler domain with guard delay bins or guard Doppler bins respectively. The use of guard delay bins and guard Doppler bins leads to loss in spectral efficiency.

According to non-patent literature (V. Khammammetti et al. "OTFS-based multiple-access in high doppler and delay spread wireless channels," IEEE Wireless Communications Letters, vol. 8, no. 2, pp. 528-531, 2019), an Interleaved Delay-Doppler Multiple Access (IDDMA) scheme is proposed. The proposed technique discloses allocating interleaved de-Do resource blocks to users with no guard bins. However, the proposed technique requires users to generate an entire OTFS frame for transmission, irrespective of the allocation size of resources.

According to another non-patent literature M. Li et al. "A new path division multiple access scheme for the massive MIMO-OTFS networks," IEEE Journal on Selected Areas in Communications, vol 39, no. 4, pp. 903-918, 2021, an angle-de-Do domain resource allocation is considered for massive Multiple Input Multiple Output (MIMO) scenarios. However, the proposed technique requires users to generate an entire OTFS frame for transmission, irrespective of the allocation size of resources. In addition, the proposed technique requires a large number of Antennas at the base station compared to the number of users and is applicable in both uplink & downlink scenarios.

According to yet another non-patent literature T. Thaj al. "Orthogonal Time Sequency Multiplexing Modulation," IEEE WCNC-2021, pp. 1-7, 2021, an Orthogonal Time Sequency Multiplexing (OTSM) is disclosed. However, the OTSM does not disclose multi-access mechanisms to support multi-users in the uplink transmission.

Therefore, there is a need for a method and apparatus for a multi-access mechanism for multiple users in the uplink transmission irrespective of waveforms. The present disclosure is directed to overcome one or more limitations stated above, and any other limitation associated with the prior arts.

SUMMARY OF INVENTION

One or more shortcomings of the prior art are overcome, and additional advantages are provided through the present disclosure. Additional features and advantages are realized through the techniques of the present disclosure. Other embodiments and aspects of the disclosure are described in detail herein and are considered a part of the claimed disclosure.

According to an embodiment, the present disclosure relates to a multi-access method for uplink transmission of different waveforms in wireless communication. The method comprises receiving an allocation of one or more indices among a plurality of indices for a respective user among a plurality of users. The one or more indices are allocated for uplink transmission of modulated symbols from each of the plurality of users based on the allocation of one or more indices. Further, the method comprising transforming the modulated symbols for each index of the one or more indices allocated to the respective user, the modulated symbols are transformed using a first matrix being selected based on a type of the different waveforms for the uplink transmission. Furthermore, the method comprises generating discrete-time signals by upsampling the transformed symbols by a factor of the plurality of indices. One or more zeroes are stuffed during upsampling of the transformed symbols for the respective user and the upsampled symbols are circularly right shifted by an index number of shifts. The index number relates to a sequence number of the one or more indices allocated to the respective user. Thereafter, the method comprises transmitting uplink signals from each user to an access point or a base station by combining the upsampled and circularly shifted symbols of each user corresponding to the one or more indices allocated to the user.

According to another embodiment, a multi-access method for uplink transmission of different waveforms in wireless communication is disclosed. The method comprises receiving an allocation of one or more indices among a plurality of indices for a respective user among a plurality of users. The one or more indices are allocated for the uplink transmission of modulated symbols from each user of the plurality of users The modulated symbols for each user are represented by a second matrix. The second matrix includes a number of rows similar to the plurality of indices. Each row of the second matrix relate to either the one or more indices allocated to the respective user or non-allocated row of indices for the respective user. One or more rows that relate to the one or more indices allocated to the respective user include the modulated symbols of uplink signals for being transmitted to an access point or a base station. At least one row of the second matrix corresponding to the non-allocated row of indices for the respective user includes zero value. Further, the method comprises transforming each row of the second matrix for the respective user using a first matrix that is being selected based on a type of the different waveforms of the uplink signals. Furthermore, the method comprises computing vectorization of the transformed second matrix to generate discrete-time signals for the plurality of users. Thereafter, the method comprises transmitting the generated discrete-time signals of the plurality of users to an access point or a base station.

According to yet another embodiment, a communication apparatus for multi-access uplink transmission of different waveforms in wireless communication is disclosed. The communication apparatus comprises a receiver, at least one processor, and a transmitter. The receiver is configured to receive an allocation of one or more indices among a plurality of indices for a respective user among a plurality of users. The one or more indices are allocated for uplink transmission of modulated symbols from each of the plurality of users. The at least one processor is communicatively coupled with the receiver. The at least one processor is configured to transform the modulated symbols for each index of the one or more indices allocated to the respective user. The modulated symbols are transformed using a first matrix being selected based on a type of the different waveforms for the uplink transmission. The at least one processor is configured to generate discrete-time signals by upsampling the transformed symbols by a factor of the plurality of indices. One or more zeroes are stuffed during upsampling of the transformed symbols for the respective user and the upsampled symbols are circularly right shifting by an index number of shifts. The index number relates to a sequence number of the one or more indices allocated to the respective user. Further, the transmitter is communicatively coupled with the receiver and the at least one processor. The transmitter is configured to transmit uplink signals from the respective user to an access point or a base station by combining the upsampled and circularly shifted symbols of each user corresponding to the one or more indices allocated to the user.

According to yet another embodiment, a communication apparatus for Multi-access uplink transmission of different waveforms in wireless communication. The communication apparatus comprises a receiver, at least one processor, and a transmitter. The receiver is configured to receive an allocation of one or more indices among a plurality of indices for a respective user among a plurality of users. The one or more indices are allocated for the uplink transmission of modulated symbols from each user of the plurality of users based on the allocated one or more indices. The modulated symbols for each user are represented by a second matrix. The at least one processor is communicatively coupled with the receiver. The at least one processor is configured to transform each row of the second matrix for the respective user using a first matrix that is selected based on a type of the different waveforms of the uplink signals. Further, the at least one processor is configured to compute a vectorization of the transformed second matrix to generate discrete-time signals for the plurality of users. Further, the transmitter is communicatively coupled with the receiver and the at least one processor. The transmitter is configured to transmit the generated discrete-time signal the respective user to an access point or a base station.

The foregoing summary is illustrative only and is not intended to be in any way limiting. In addition to the illustrative aspects, embodiments, and features described above, further aspects, embodiments, and features will become apparent by reference to the drawings and the following detailed description.

A BRIEF DESCRIPTION OF THE DRAWINGS

The novel features and characteristics of the disclosure are set forth in the appended claims. The disclosure itself, however, as well as a preferred mode of use, further objectives, and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

FIG. 4 illustrates an exemplary embodiment of a combined received signal at the base station for a two-user scenario, in accordance with an embodiment of the present disclosure;

DETAILED DESCRIPTION OF THE PREFERRED EMBODIMENTS

Figure 1:
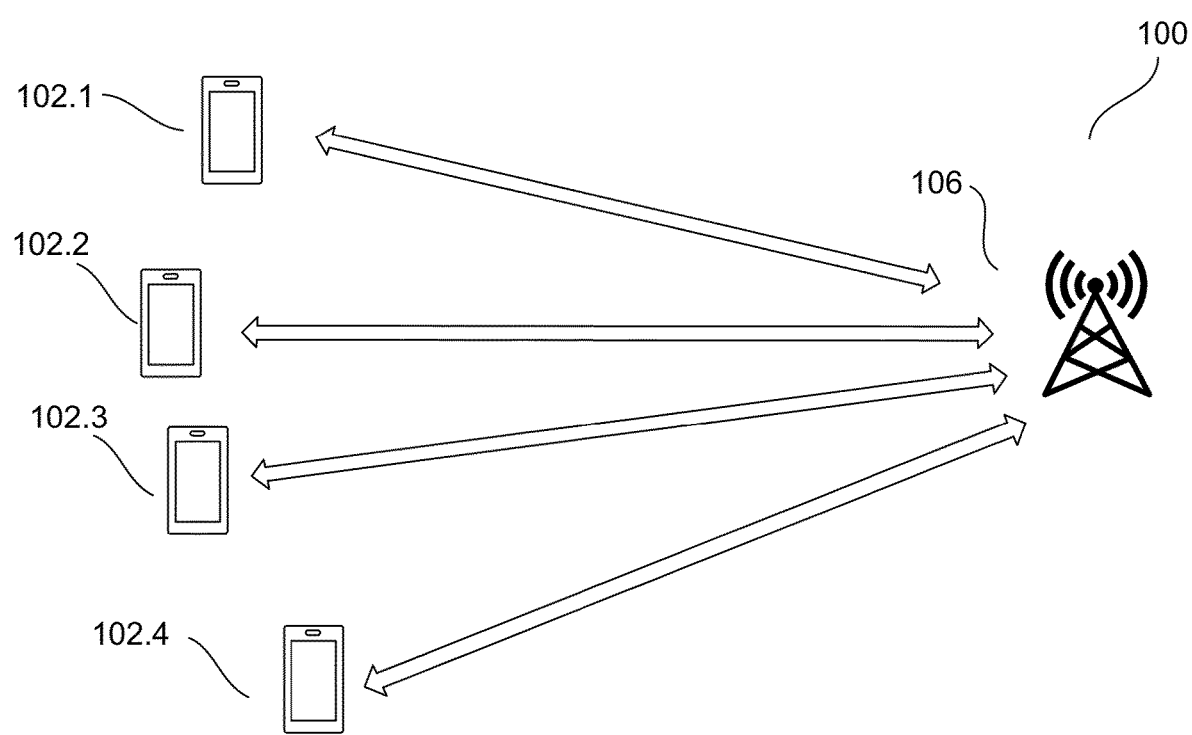
FIG. 1 illustrates a schematic diagram of a wireless communication system including a plurality of communication apparatuses, in accordance with an embodiment of the present disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the forms disclosed, but on the contrary, the disclosure is to cover all modifications, equivalents, and alternatives falling within the spirit and the scope of the disclosure.

The terms "comprises", "comprising", or any other variations thereof, are intended to cover a non-exclusive inclusion, such that a setup, device, or process that comprises a list of components or steps does not include only those components or steps but may include other components or steps not expressly listed or inherent to such setup or device or process. In other words, one or more elements in a system or apparatus proceeded by "comprises . . . a" does not, without more constraints, preclude the existence of other elements or additional elements in the system or apparatus.

In the following detailed description of the embodiments of the disclosure, reference is made to the accompanying drawings that form a part hereof, and which are shown by way of illustration-specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiment of the present disclosure provides a mechanism for transmitting data by multiple users, intended for reception by a single receiver, such as a base station or an access point. A communication from a plurality of user devices or user equipment respective to the multiple users to the base station or the access points is commonly referred to as uplink or reverse link communication. Also, the mechanism is generally known as a method for multiple-access communication.

FIG. 1 illustrates a schematic diagram of a wireless communication system including a plurality of communication apparatuses, in accordance with an embodiment of the present disclosure. As shown in FIG. 1, the wireless communication system 100 includes the plurality of communication apparatuses 102.1, 102.2, 102.3, . . . , 102.J. Unless, however, it is necessary to particularly distinguish each of the plurality of the communication apparatuses having substantially the same functional configuration, the present disclosure only includes reference numeral 102. In a non-limiting example, the communication apparatuses 102.1, 102.2, 102.3, and 102.4 may simply be alternatively referred to as the communication apparatus 102 unless it is not particularly necessary to distinguish them. The communication apparatus 102 is communicatively connected with a base station 106 or an access point via a wireless medium.

According to an embodiment, the communication apparatus 102 refers to any user device or user equipment used for transmitting, receiving, or processing information in a communication system. These apparatuses play a crucial role in enabling various forms of communication, such as voice, data, and multimedia, between individuals, devices, or systems. The communication apparatus 102, by way of example, may relate to a smartphone, a mobile phone, a laptop, a notebook computer, a tablet, or any dedicated device having communication capabilities.

According to an embodiment, the base station 106 is a fixed communication station that is part of a network's wireless telephone system. The base station 106 is configured to relay information to and from the communication apparatus 102 via the wireless medium. The base station 106 allows the communication apparatus 102 to get access to the network within a frequency coverage area of the base station 106. The base station 106 is generally a transceiver, capable of sending and receiving wireless signals to and from other devices. A communication medium may be considered as a cellular connection when the communication apparatus 102 communicates with the base station 106 via the wireless medium.

Figure 2:
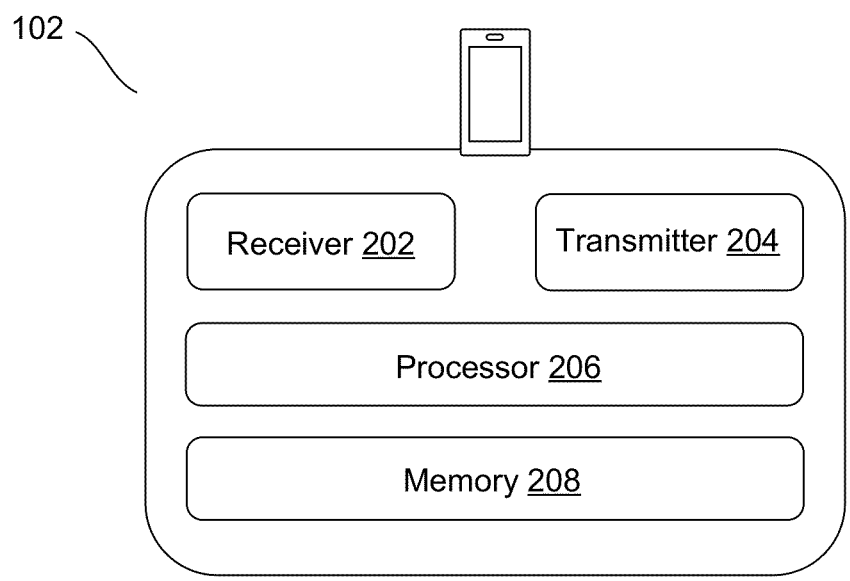
FIG. 2 illustrates a schematic diagram of the communication apparatus as shown in FIG. 1, in accordance with an embodiment of the present disclosure.

FIG. 2 illustrates a schematic diagram of the communication apparatus as shown in FIG. 1, in accordance with an embodiment of the present disclosure.

According to an embodiment, the communication apparatus 102 includes a receiver 202, a transmitter 204, at least one processor 206 (hereinafter may be alternatively referred to as the processor 206), and a memory 208. The receiver 202, the transmitter 204, the processor 206, and the memory are communicatively coupled with each other to perform one or more operations disclosed throughout the disclosure. The communication apparatus 102 is configured for multi-access uplink transmission of different waveforms in the wireless communication. The different waveforms may relate to an Orthogonal Time Frequency Space (OTFS) waveform, an orthogonal time sequency multiplexing (OTSM) waveform, and a Block Single-Carrier waveform.

According to an embodiment, the receiver 202 is a device or circuit that is responsible for receiving and extracting information or signals from a transmitted signal. The receiver 202 is the counterpart to the transmitter 204. The receiver 202 receives a signal transmitted by the base station 106, which may have experienced distortion or interference during transmission, and processes it to extract the original information. The receiver 202 typically involves components such as antennas, filters, amplifiers, demodulators, and decoders. The antennas generally capture the transmitted signal, which is then filtered to remove any unwanted noise or interference.

The receiver 202 is configured to receive an allocation of one or more indices among a plurality of indices for a respective user among a plurality of users. The one or more indices are allocated for uplink transmission of modulated symbols from each of the plurality of users based on the allocated one or more indices. Particularly, the base station 106 determines the plurality of indices based on available frequency bandwidth and sub-carrier spacing for the uplink transmission. Further, the base station 106 allocates the one or more indices among the plurality of indices based on the uplink transmission required by the respective user via the communication apparatus 102. In a non-limiting example, the base station 106 may determine four indices based on the available frequency bandwidth and sub-carrier spacing. Further, four users are simultaneously connecting with the base station 106. Thus, each receiver 202 of the communication apparatus 102 of the respective user receives one index among the four indices. In another non-limiting example, three users may simultaneously connect to the base station 106 in which the base station 106 determines four indices. In this scenario, a first user may receive two indices, where a second user and a third user receive an index each.

For example, each $j^{th}$ user may be assigned with one or more $K_j$ indices, where j denotes 1, . . . , J. The one or more indices allocated to the respective user are mutually exclusive. Each index among the one or more indices allocated to the respective user or the communication apparatus 102 may transmit a burst of information-bearing Quadrature Amplitude Modulated (QAM) symbols of length N via the transmitter 204. Particularly, the respective user may transmit the QAM symbols of length N multiplied by $K_j$ via the transmitter 204. Further, N is a number of the modulated symbols to be transmitted for each index of the one or more indices. The number of modulated symbols is set based on a frame duration requirement for the uplink transmission. Furthermore, the symbols may be modulated by at least one of Phase Shift Keying (PSK), technique or any other suitable modulation technique instead of QAM.

According to an embodiment, the processor 206 may be operatively coupled to one or more modules for processing, executing, or performing a set of operations. In an embodiment, the processor 206 may include at least one data processor for executing processes in a Virtual Storage Area Network. The processor 206 may include specialized processing units such as integrated system (bus) controllers, memory management control units, floating point units, graphics processing units, digital signal processing units, etc. In one embodiment, the processor 206 may include a central processing unit (CPU), a graphics processing unit (GPU), or both. The processor 206 may be one or more general processors, digital signal processors, application-specific integrated circuits, field-programmable gate arrays, servers, networks, digital circuits, analog circuits, combinations thereof, or other now-known or later developed devices for analyzing and processing data. The processor 206 may execute one or more instructions, such as code generated manually (i.e., programmed) to perform one or more operations disclosed herein throughout the disclosure.

Figure 3:
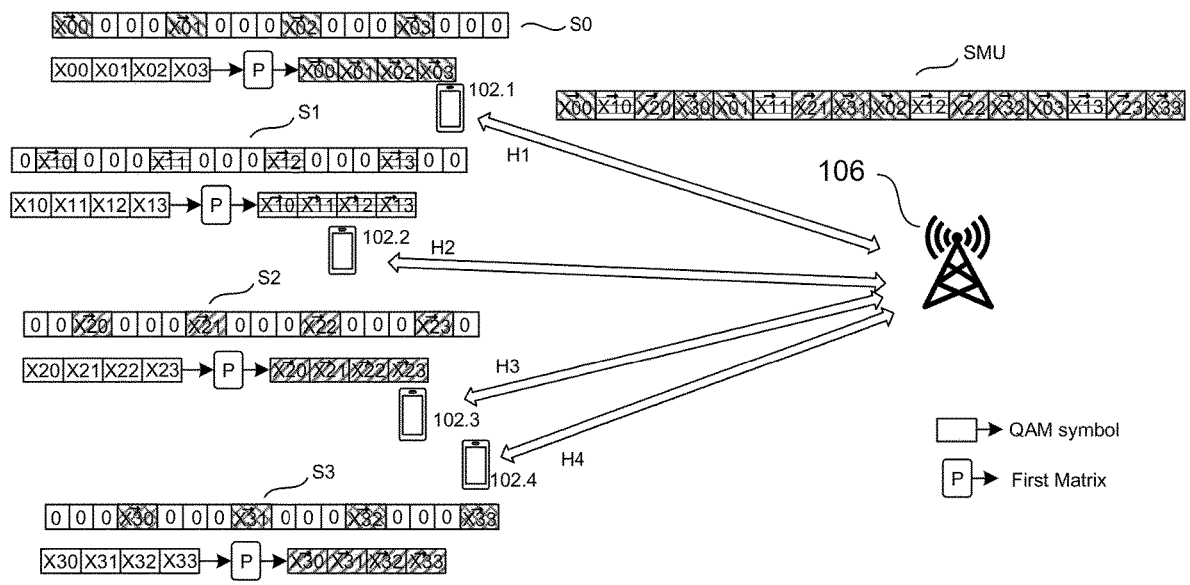
FIG. 3 illustrates an exemplary embodiment of the multi-access uplink transmission for different waveforms, in accordance with an embodiment of the present disclosure.

The processor 206 is configured to transform the modulated symbols using a first matrix P (as shown in FIG. 3) of size N*N for each index of the one or more indices allocated to the respective user. Further, instead of using matrix P for the transformation of the modulated symbols, the processor 206 may be configured to transform the modulated symbols using any other low complexity algorithms for the equivalent transformation The first matrix P is selected based on a type of the different waveforms for the uplink transmission, as shown in Table 1 below. The first matrix P may correspond to an Inverse Discrete Fourier Transform (IDFT) matrix ($F^H_N$) for the OTFS waveform. Further, the first matrix P may correspond to a Walsh-Hadamard Transform (WHT) matrix ($W_N$) for the OTSM waveform. Furthermore, the first matrix P may correspond to an Identity Matrix ($I_N$) matrix for the Block Single-Carrier waveform.

TABLE 1

| Scheme | OTFS | OTSM | Block SC |
|---|---|---|---|
| Matrix P | $F^H_N$ | $W_N$ | $I_N$ |

Further, the processor 206 is configured to generate discrete-time signals by upsampling the transformed symbols by a factor of the plurality of indices. During upsampling, one or more zeroes are stuffed in the transformed symbols for the respective user. Further, circularly right shifting the upsampled symbols after stuffing one or more zeroes by the index number of shifts. The index number relates to a sequence number of the one or more indices allocated to the respective user.

According to an embodiment, the transmitter 204 is a device or circuit that is responsible for transmitting information or signals from the sender to the receiver. The transmitter 204 particularly converts the information into a form suitable for transmission over a communication channel or medium. The communication channel or medium may correspond to a wireless communication channel. The transmitter 204 takes the input signals, which could be in various formats such as audio, video, or data, and processes them to modulate a carrier signal. Modulation is the process of impressing the information onto the carrier signal, enabling it to be transmitted efficiently over the communication channel. The functionality and complexity of the transmitter 204 can vary depending on the specific communication system. For example, in wireless communication systems, the transmitter 204 may include components like an antenna, amplifiers, filters, modulators, and encoders. In wired communication systems, the transmitter 204 may involve components like amplifiers, modulators, and connectors.

The transmitter 204 is configured to transmit uplink signals from the respective user or the communication apparatus 102 to the base station 106 by combining the generated discrete-time signals of each user for the allocated one or more indices. Therefore, all the independently generated upsampled and circularly shifted transformed symbols for each allocated delay index are combined and transmitted by the $j^{th}$ user for the uplink transmission.

According to an embodiment, the memory 208 may include any non-transitory computer-readable medium known in the art. The memory 208 is communicatively coupled with the processor 206 to store bitstreams or processing instructions for completing one or more processes disclosed in the present disclosure.

According to another embodiment, the receiver 202 is configured to receive an allocation of one or more indices among a plurality of indices for a respective user among a plurality of users. The one or more indices are allocated for the uplink transmission of modulated symbols from each user of the plurality of users based on the allocated one or more indices. The modulated symbols for each user are represented by a second matrix instead of the vector. The second matrix includes a number of rows similar to the plurality of indices. One or more rows of the second matrix relate to the one or more indices allocated to the respective user. Further, the one or more rows that relate to the one or more indices include modulated symbols of uplink signals for being transmitted by the respective user. Furthermore, at least one row of the second matrix corresponding to non-allocated row of indices to the respective user includes zero value. For example, the second matrix includes M rows and N columns for the uplink transmission. M relates to the plurality of indices. N relates to the length of the QAM symbols being transmitted for each index allocated to the user. Further, the second matrix for the respective user includes QAM symbols in the rows allocated to the respective user. For example, the first user is assigned a first index and a second index among four indices. Therefore, the second matrix for the first user includes QAM symbols in a first row and a second row of the second matrix. Further, a third row and a fourth row of the second matrix for the first user include zero values.

Further, the processor 206 transforms each row of the second matrix for the respective user using the first matrix, P, that is being selected based on the type of the different waveforms of the uplink signals. The first matrix, P, may correspond to N*N matrix being selected based on the type of different waveforms. Upon transforming each row of the second matrix, the processor 206 computes vectorization of the transformed second matrix to generate discrete-time signals for the plurality of users. In the vectorization process, the matrix values of the transformed second matrix are transformed in the vector form for the uplink transmission. Thereby, the transmitter 204 is configured to transmit the combined upsampled and circularly right shifted symbols of each user to the base station 106. Therefore, according to the embodiment disclosed herein, the upsampling, circular shifting, and combination may not be required due to defining the second matrix for each user while allocating the one or more indices.

The plurality of indices is determined based on available frequency bandwidth and sub-carrier spacing for uplink transmission. Also, the number of the modulated symbols to be transmitted for each index of the one or more indices is set based on a frame duration requirement for the uplink transmission.

FIG. 3 illustrates an exemplary embodiment of the multi-access uplink transmission for different waveforms, in accordance with an embodiment of the present disclosure.

As depicted in FIG. 3, four communication apparatuses, i.e., 102.1, 102, 102.3, and 102.4 communicated with the base station 106 via the wireless medium for the uplink transmission. Further, as shown in FIG. 3, each user or communication apparatus receives the allocation of one index among four indices for uplink transmission of the modulated symbols. As illustrated in FIG. 3, the modulated symbols are the QAM symbols. Upon receiving the allocation of one index, the processor 206 of each communication apparatus 102 transforms the QAM symbols with the first matrix P. Thus, for the first user, the transformed symbols are represented as, $\vec{x00}$, $\vec{x01}$, $\vec{x02}$, $\vec{x03}$. Similarly, for the second user, the transformed symbols are represented as, $\vec{x10}$, $\vec{x11}$, $\vec{x12}$, $\vec{x13}$. In the exemplary embodiment, the plurality of indices refers to four indices that is represented by M. In addition, the first matrix P is represented a size of 4*4 matrix. Therefore, the transformed symbols are of size four for each user.

Thereafter, the processor 206 of each communication apparatus 102 generates discrete-time signals by upsampling the transformed symbols by a factor of the plurality of indices. Thus, the processor 206 generates the discrete-time signals by stuffing three zeroes for each of the transformed symbols to upsample the transformed symbols for the respective user. Thus, each transformed symbol of size N is upsampled to be the size of M*N. In the exemplary embodiment, the upsampled symbols are of the size of 4*4=16. Further, the processor 206 circularly shifts the upsampled symbols based on each index of the one or more indices allocated to the respective user. For example, for the first user (i.e., for the communication apparatus 102.1), the circular shift is 0. Further, for the second user (i.e., for the communication apparatus 102), the circular shift is 1. Particularly, for the second user, the upsampled symbols are circularly shifted to position one zero at an initial position of the upsampled symbols. Similarly, for the third user (i.e., for the communication apparatus 102.3), the circular shift is 2 and for the fourth user (i.e., for the communication apparatus 102.4), the circular shift is 3.

Further, upon generating the discrete-time signals, the transmitter 204 transmits uplink signals by combining the generated discrete-time signals of each user for the allocated index. As shown in FIG. 3, the base station 106 receives the combined generated discrete-time signals from the communication apparatus 102.1, 102, 102.3, and 102.4. The combined discrete signals include signals from each user from the plurality of users. The combined received signal at the base station has the form of a received signal corresponding to a single user transmission.

According to an embodiment, an unified expression for the transformed modulated signals is expressed as per equation (1) shown below:

$$s = vec(XP) \quad (1)$$

where X is the modulated symbols represented in M*N matrix; P is the first matrix of N*N; and s is a discrete time signal, after including Cyclic Prefix (CP), being transmitted to the base station.

In a non-limiting example, X of size M*N may be represented by equation (2) as mentioned below. In addition, the first matrix P of size N*N may be selected based on the waveforms of the uplink transmission as shown in Table 1.

$$X = \begin{bmatrix} x(0,0) & x(0,1) & \cdots & x(0,N-1) \\ x(1,0) & x(1,1) & \cdots & x(1,N-1) \\ \vdots & \vdots & \ddots & \vdots \\ x(M-1,0) & x(M-1,1) & \cdots & x(M-1,N-1) \end{bmatrix} \quad (2)$$

The plurality of indices or circular delays l=0, 1, . . . (M−1) may be partitioned into J number of sets for J user. Each set of the J number of sets includes one or more indices or circular details. Each set of the J number of sets is represented as $\Omega j$ and is assigned to $j^{th}$ user. The value of J may relate to 1, 2, . . . , J, and K j as the cardinality of the set.

The source bits or channel encoded bits are mapped to QAM symbols which are divided into N-length vectors and arranged as row vectors of M×N matrix $X_j$ as shown in equation (3).

$$X_j = \sum_{l \in \Omega_j} e_l x_{j,l}^T \quad (3)$$

where $x_{j,l}=[x_j(1,0), x_j(1,1), \ldots, x_j(1,N-1)]^T$ are the QAM symbols of the $j^{th}$ user associated with the index l from the allocated delay set $\Omega j$ and where $e_l=[e_0, e_1, \ldots, e_m, \ldots, e_{M-1}]^T$ for l=0, 1, . . . , M−1, with value of $e_m$ may be represented as per equation (4):

$$e_m = \begin{cases} 0, & \forall m \neq l. \\ 1, & m = l. \end{cases} \quad (4)$$

Then the $j^{th}$ user transmits signal as per equation (5):

$$s_j = vec(X_j P). \tag{5}$$

where Vec represents vectorization operation.

After including a cyclic prefix, the $j^{th}$ user transmit signal given in equation (5) may be transmitted. Multi-user transmission for 4-user case is shown in FIG. 3 where M=4, and N=4. As shown in FIG. 3, $s_0$, $s_1$, $s_2$, and $s_3$ correspond to discrete time-signals generated by stuffing one or more zeroes and circular shifting. Further, combining the generated discrete signals may be represented SMU as shown in equation (6):

$$s_{MU} = \sum_{j=1}^{J} s_j. \tag{6}$$

The base station 106 receives a combined signal from all users, i.e., J users after discarding CP and proper synchronization. The combined signal may be represented as shown in equation (7):

$$y = \sum_{j=1}^{J} H_j s_j + w, \tag{7}$$

where $H_j$ is the time domain channel matrix for the $j^{th}$ user. As shown in FIG. 3, the first user, the second user, the third user, and the fourth user transmit $s_1$, $s_2$, $s_3$, and $s_4$ with channel matrices $H_1$, $H_2$, $H_3$, and $H_4$, respectively.

Further, the combined signal received in the base station may also be represented as equation (8).

$$y = H_{eff} s_{MU} + w \tag{8}$$

where w is noise, $H_{eff}$ is an effective time domain channel matrix, $$H_{eff} \triangleq \sum_{j=1}^{J} H_j (I_N \otimes D_j),$$

where $\otimes$ represents Kronecker Product, D is an M*M diagonal matrix represented as:

$$D_j = \sum_{l \in \Omega_j} \text{diag}\{e_l\}.,$$

and I is an identity matrix of size N*N.

From equation (8), the time domain received signal at the base station 106 during uplink transmission from the plurality of users appears as if the base station 106 only receives from a single user. Thus, the present disclosure of the multi-access scheme facilitates the processing of received signals from the single user, although the base station 106 receives the signals from the plurality of users. Further, the receiver signal processing complexity for the multiple-access scheme is independent of the number of users.

FIG. 4 illustrates an exemplary embodiment of a combined received signal at the base station for a two-user scenario, in accordance with an embodiment of the present disclosure.

For the two-user scenario, the value of M and N may be considered as 2. The discrete-time signals $s_1$ and $s_2$ are combined with the channel matrix $H_1$ and $H_2$ to generate the combined signal, y as shown in equation (8).

Figure 5:
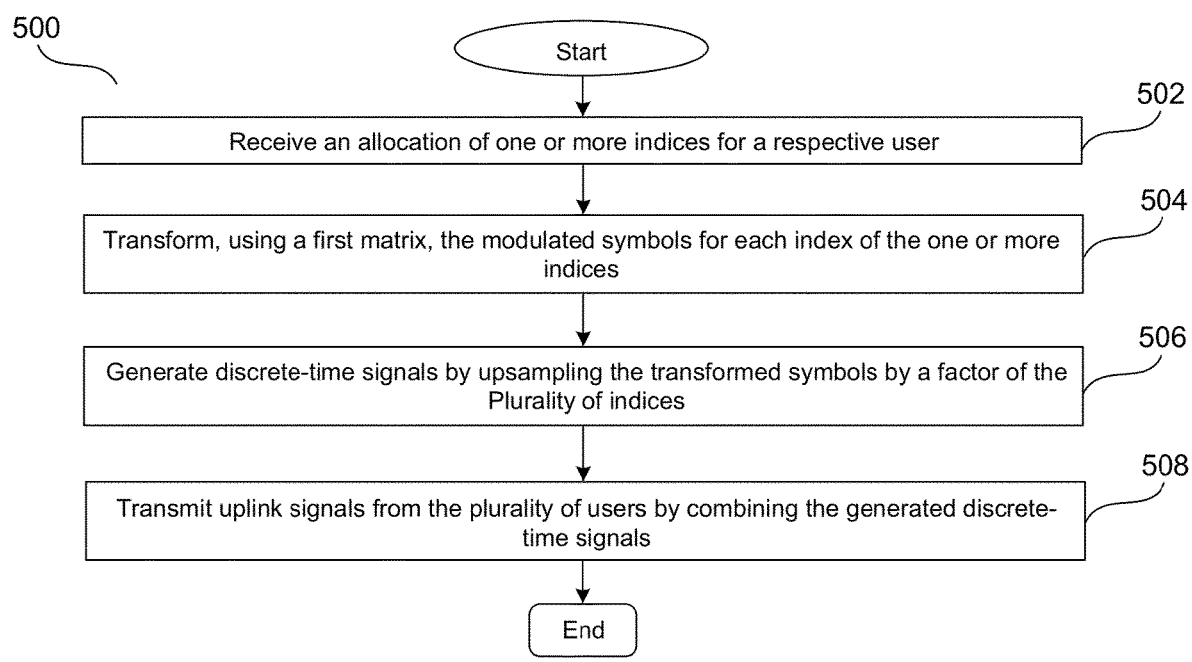
FIG. 5 illustrates a flow chart of the multi-access method for the uplink transmission of different waveforms in wireless communication, in accordance with an embodiment of the present disclosure.

FIG. 5 illustrates a flow chart of the multi-access method for the uplink transmission of different waveforms in wireless communication, in accordance with an embodiment of the present disclosure. As depicted in FIG. 5, the method 500 includes a series of steps 502 through 508 for multi-access method of uplink transmission. The details of the method 500 have been explained below in forthcoming paragraphs. The order in which the method steps are described below is not intended to be construed as a limitation, and any number of the described method steps can be combined in any appropriate order to execute the method or an alternative method. Additionally, individual steps may be deleted from the method without departing from the scope of the present disclosure. The method step 500 begins from a start block and starts execution of operations in step 502, as shown in FIG. 5.

In step 502, the method 500 comprises receiving the allocation of one or more indices among the plurality of indices for the respective user among the plurality of users. The one or more indices are allocated for uplink transmission of modulated symbols from each of the plurality of users based on the allocated one or more indices. Particularly, the receiver 202 is configured to receive the allocation of the one or more indices from the base station 106. The flow of the method 500 now proceeds to step 504.

In step 504, the method comprises transforming the modulated symbols using the first matrix (P) for each index of the one or more indices allocated to the respective user. The first matrix (P) is selected based on a type of the different waveforms for the uplink transmission. Particularly, the processor 206 is configured to transform the modulated symbols using the first matrix. The flow of the method 500 now proceeds to step 506.

In step 506, the method 500 comprises generating discrete-time signals by upsampling the transformed symbols by the factor of the plurality of indices. For generating discrete-time signals, the method includes stuffing one or more zeroes during upsampling of the transformed symbols for the respective user. Further, upon stuffing one or more zeroes, the method comprises circularly shifting the upsampled symbols based on each index of the one or more indices allocated to the respective user. Particularly, the processor 206 is configured to generate discrete-time signals by upsampling the transformed symbols by the factor of the plurality of indices. The flow of the method 500 now proceeds to step 508.

In step 508, the method 500 comprises transmitting uplink signals from each user to the base station 106 by combining the upsampled and circularly shifted symbols of each user corresponding to the one or more indices allocated to the user.

While the above-discussed steps in FIG. 5 are shown and described in a particular sequence, the steps may occur in variations to the sequence in accordance with various embodiments. Further, a detailed description related to the various steps of FIG. 5 is already covered in the description related to FIGS. 1-4 and is omitted herein for the sake of brevity.

Figure 6:
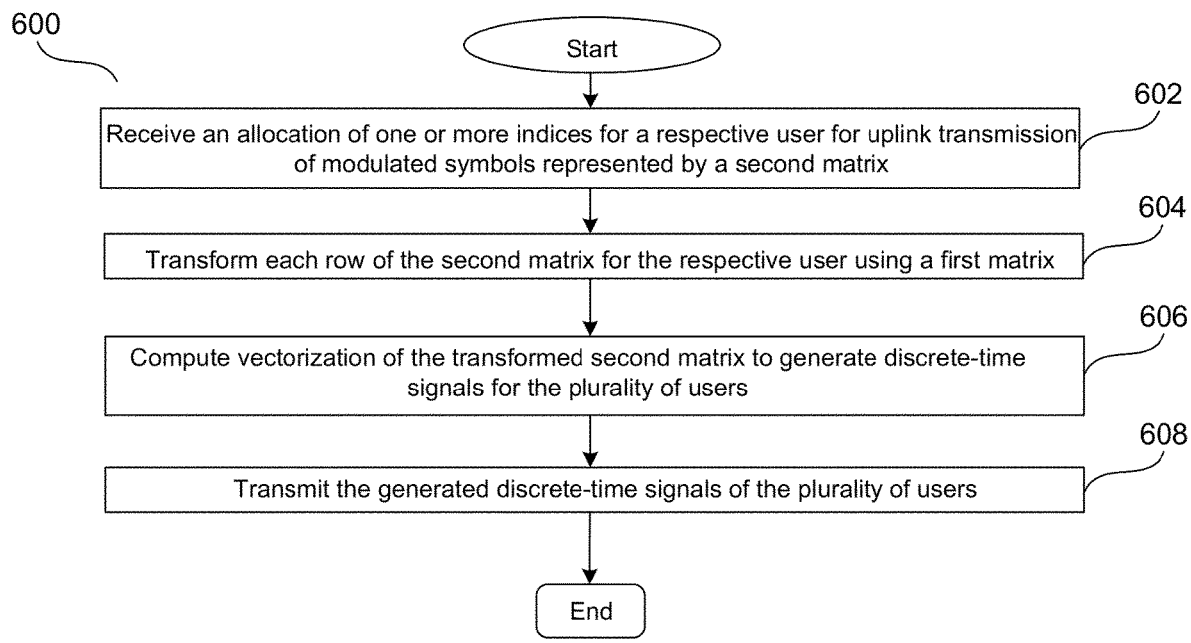
FIG. 6 illustrates another flow chart of the multi-access method for the uplink transmission of different waveforms in wireless communication, in accordance with another embodiment of the present disclosure.

FIG. 6 illustrates another flow chart of the multi-access method for the uplink transmission of different waveforms in wireless communication, in accordance with another embodiment of the present disclosure.

The method step 600 begins from a start block and starts execution of operations in step 602, as shown in FIG. 6.

In step 602, the method 600 comprises receiving the allocation of one or more indices among the plurality of indices for the respective user among the plurality of users. The one or more indices are allocated for the uplink transmission of modulated symbols from each user of the plurality of users based on the allocated one or more indices. The modulated symbols for each user are represented by the second matrix instead of the vector as defined for method 500. Particularly, the receiver 202 receives the allocation of the one or more indices among the plurality of indices for the respective user. The second matrix includes the number of rows similar to the plurality of indices. One or more rows of the second matrix relate to the one or more indices allocated to the respective user. Further, the one or more rows that relate to the one or more indices include modulated symbols of uplink signals being transmitted by the respective user. Furthermore, at least one row of the second matrix corresponding to non-allocated row of indices to the respective user includes zero value. The flow of the method 600 now proceeds to step 604.

In step 604, the method comprises transforming each row of the second matrix for the respective user using the first matrix, P. The first matrix is being selected based on the type of the different waveforms of the uplink signals as shown in Table 1. Particularly, the processor 206 is configured to transform each row of the second matrix for the respective user using the first matrix. The first matrix, P, may correspond to N*N matrix. The flow of the method 600 now proceeds to step 606.

In step 606, the method 600 comprises computing vectorization of the transformed second matrix to generate discrete-time signals for the plurality of users. Particularly, the processor 206 is configured to compute vectorization of the transformed second matrix. In the vectorization process, the matrix values of the transformed second matrix are transformed in the vector form for the uplink transmission. The flow of the method 600 now proceeds to step 608.

In step 608, the method 600 comprises transmitting the uplink signals from each user to an access point or a base station by combining the upsampled and circularly shifted symbols of each user corresponding to the one or more indices allocated to the user. Particularly, the transmitter 204 is configured to transmit the generated discrete-time signals to the base station 106.

While the above-discussed steps in FIG. 6 are shown and described in a particular sequence, the steps may occur in variations to the sequence in accordance with various embodiments. Further, a detailed description related to the various steps of FIG. 6 is already covered in the description related to FIGS. 1-4 and is omitted herein for the sake of brevity.

Figure 7A:
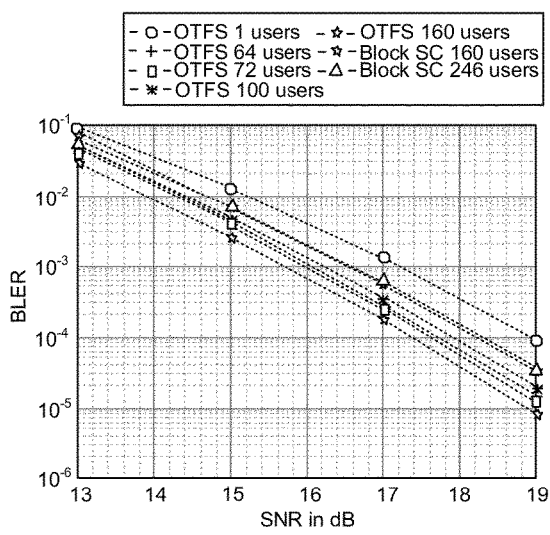
FIG. 7A illustrates a graphical representation of performance of Coded Block Error Rate (BLER) of the multi-access method with a different number of users for a successive interference cancellation receiver at the base station, in accordance with an embodiment of the present disclosure.

FIG. 7A illustrates a graphical representation of performance of Coded Block Error Rate (BLER) of the multi-access method with a different number of users for a successive interference cancellation receiver at the base station, in accordance with an embodiment of the present disclosure.

As shown in FIG. 7A, X-axis relates to Signal-to-Noise (SNR) ratio and Y-axis refers to the BLER. FIG. 7A depicts that using both the waveforms OTFS and block SC, a sustainable performance is achieved even for a high number of users such as 246 users. Therefore, the multi-access scheme of the present disclosure provides uplink transmission for large number of users in different waveforms.

Figure 7B:
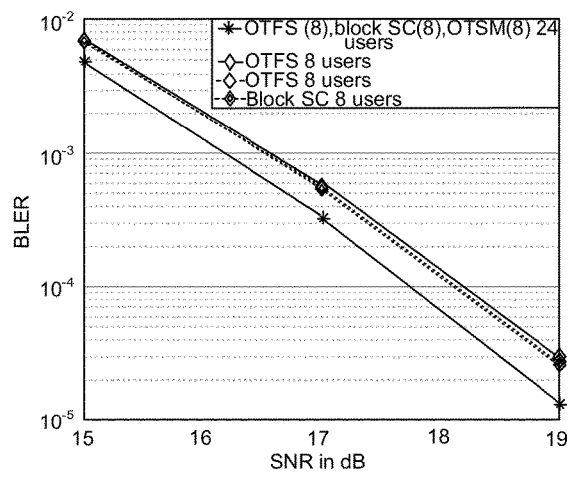
FIG. 7B illustrates a graphical representation comparing the BLER performance when different users use different waveforms, in accordance with an embodiment of the present disclosure.

FIG. 7B illustrates a graphical representation comparing the BLER performance when different users use different waveforms against all users use the same waveform, in accordance with an embodiment of the present disclosure.

FIG. 7B illustrates comparison of the BLER where the plurality of users uses different first matrix as depicted in Table 1, for a turbo receiver at the base station 106. As shown in FIG. 7B, the BLER performance is sustainable and the multi-access scheme of the present disclosure fulfills different users' requirements in the simultaneous transmission. An experiment is performed based on parameters M=512, N=128, and 16 QAM modulation symbols.

Figure 8:
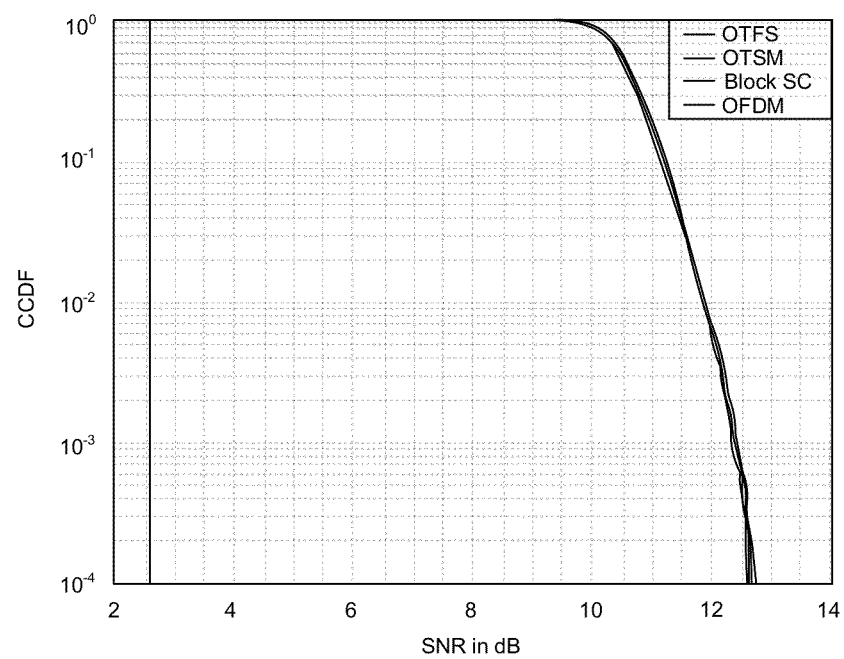
FIG. 8 illustrates a graphical representation of a Peak to Average Power Ratio (PAPR) for different waveforms, in accordance with an embodiment of the present disclosure.

FIG. 8 illustrates a graphical representation of a Peak to Average Power Ratio (PAPR) for different waveforms, in accordance with an embodiment of the present disclosure.

An experiment is performed based on the parameters M=512, N=128, and 16 QAM modulation symbols. As shown in FIG. 8, the PAPR is the lowest for block SC, among all the waveforms shown. Therefore, low-cost, low-power amplifiers can be used for uplink transmission by implementing the multi-access scheme of the present disclosure using the single-carrier waveform.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiment will be apparent to those skilled in the art.

Advantages of the Present Disclosure

The present disclosure relates to multi-access method and communication apparatus for uplink transmission of different waveforms in wireless communications. The complexity of signal generation from user perspective is limited by the number of row indices allocated to the user as there is no need to generate an entire frame of M*N samples in the uplink. The method and communication apparatus allow the multiple users communicate to the base station by using OTFS, OTSM, or Block Single-Carrier waveform for data transmission. Further, the method and communication apparatus allow different users to use different first matrix for the simultaneous data transmission using different waveforms OTFS, OTSM, and Block Single-Carrier waveform. Further, the method and the communication apparatus do not require any guard delay bins (intervals) between users' transmissions for the purpose of multiple access. In addition, the base station 106 or the receivers used for processing signals from a single user may be adapted to process the received signal for multi-user transmission using this multi-access mechanism, with fewer modifications. Further, the receiver signal processing complexity becomes independent of the number of users.

In the detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The description is, therefore, not to be taken in a limiting sense.

The invention claimed is:

1. A multi-access method (500) for uplink transmission of different waveforms in wireless communication, the method comprising:
   receiving (502) an allocation of one or more indices among a plurality of indices for a respective user among a plurality of users for uplink transmission of modulated symbols from each of the plurality of users based on the allocated one or more indices;
   transforming (504), using a first matrix (P) being selected based on a type of the different waveforms for the uplink transmission, the modulated symbols for each index of the one or more indices allocated to the respective user;
   generating (506) discrete-time signals by upsampling the transformed symbols by a factor of the plurality of indices, wherein
      one or more zeroes are stuffed during upsampling of the transformed symbols for the respective user, and
      circularly right shifting, upon stuffing one or more zeroes, the upsampled symbols by an index number of shifts, wherein the index number relates to a sequence number of the one or more indices allocated to the respective user; and
   transmitting (508), to an access point or a base station (106), uplink signals from each user by combining the upsampled and circularly shifted symbols of each user corresponding to the one or more indices allocated to the user.

2. The method (500) as claimed in claim 1, wherein the symbols are modulated by at least one of Quadrature amplitude modulation (QAM), and Phase Shift Keying (PSK).

3. The method (500) as claimed in claim 1, wherein the different waveforms relate to an Orthogonal Time Frequency Space (OTFS) waveform, an orthogonal time sequency multiplexing (OTSM) waveform, and a Block Single-Carrier waveform.

4. The method (500) as claimed in claim 1, wherein the plurality of indices is determined based on available frequency bandwidth and sub-carrier spacing for uplink transmission.

5. The method (500) as claimed in claim 1, wherein a number of the modulated symbols to be transmitted for each index of the one or more indices is set based on a frame duration requirement for the uplink transmission.

6. The method (500) as claimed in claim 4, wherein the first matrix (P) corresponds to an Inverse Discrete Fourier Transform (IDFT) matrix for the OTFS waveform,
   the first matrix (P) corresponds to a Walsh-Hadamard Transform (WHT) matrix for the OTSM waveform, and
   the first matrix (P) corresponds to an Identity Matrix (IN) matrix for the Block Single-Carrier waveform.

7. A multi-access method (600) for uplink transmission of different waveforms in wireless communication, the method comprising:
   receiving (602) an allocation of one or more indices among a plurality of indices for a respective user among a plurality of users for the uplink transmission of modulated symbols from each user of the plurality of users based on the allocated one or more indices, wherein the modulated symbols for each user are represented by a second matrix;
   transforming (604) each row of the second matrix for the respective user using a first matrix (P) that is being selected based on a type of the different waveforms of the uplink signals;
   computing (606) vectorization of the transformed second matrix to generate discrete-time signals for the plurality of users; and
   transmitting (608) the generated discrete-time signals from each user to an access point or a base station (106).

8. The method (600) as claimed in claim 7, wherein the second matrix includes a number of rows similar to the plurality of indices,
   each row of the second matrix relate to either the one or more indices allocated to the respective user or non-allocated row of indices for the respective user,
   one or more rows that relate to the one or more indices allocated to the respective user include modulated symbols of uplink signals for being transmitted to an access point or a base station (106), and
   at least one row of the second matrix corresponding to the non-allocated row of indices for the respective user includes zero value.

9. The method (600) as claimed in claim 7, wherein the different waveforms relate to an Orthogonal Time Frequency Space (OTFS) waveform, an Orthogonal Time Sequency Multiplexing (OTSM) waveform, and a Block Single-Carrier waveform.

10. The method (600) as claimed in claim 7, wherein the plurality of indices is determined based on available frequency bandwidth and sub-carrier spacing for uplink transmission.

11. The method (600) as claimed in claim 7, wherein a number of the modulated symbols to be transmitted for each index of the one or more indices is set based on a frame duration requirement for the uplink transmission.

12. The method (600) as claimed in claim 9, wherein the first matrix (P) corresponds to an Inverse Discrete Fourier Transform (IDFT) matrix for the OTFS waveform,
   the first matrix (P) corresponds to a Walsh-Hadamard Transform (WHT) matrix for the OTSM waveform, and
   the first matrix (P) corresponds to an Identity Matrix (IN) matrix for the Block Single-Carrier waveform.

13. A communication apparatus (102) for multi-access uplink transmission of different waveforms in wireless communication, the apparatus (102) comprising:
   a receiver (202) that is configured to:
      receive an allocation of one or more indices among a plurality of indices for a respective user among a plurality of users for uplink transmission of modulated symbols from each of the plurality of users based on the allocated one or more indices;
   at least one processor (206) communicatively coupled with the receiver, wherein the at least one processor is configured to:

transform, using a first matrix (P) being selected based on a type of the different waveforms for the uplink transmission, the modulated symbols for each index of the one or more indices allocated to the respective user;

generate discrete-time signals by upsampling the transformed symbols by a factor of the plurality of indices, wherein one or more zeroes are stuffed during upsampling of the transformed symbols for the respective user, and circularly right shifting, upon stuffing one or more zeroes, the upsampled symbols by an index number of shifts, wherein the index number relates to a sequence number of the one or more indices allocated to the respective user; and a transmitter (204) communicatively coupled with the receiver and the at least one processor, wherein the transmitter is configured to:

transmit, to an access point or a base station (106), uplink signals from each user corresponding to the one or more indices allocated to the user.

14. A communication apparatus (102) for multi-access uplink transmission of different waveforms in wireless communication, the apparatus (102) comprising:

a receiver (202) that is configured to:

receive an allocation of one or more indices among a plurality of indices for a respective user among a plurality of users for the uplink transmission of modulated symbols from each user of the plurality of users based on the allocated one or more indices, wherein the modulated symbols for each user are represented by a second matrix;

at least one processor (206) communicatively coupled with the receiver (202), wherein the at least one processor is configured to:

transform each row of the second matrix for the respective user using a first matrix (P) that is being selected based on a type of the different waveforms of the uplink signals;

compute a vectorization of the transformed second matrix to generate discrete-time signals for the plurality of users; and a transmitter (204) communicatively coupled with the receiver (202) and the at least one processor (206), wherein the transmitter (204) is configured to:

transmit the generated discrete-time signals from each user to an access point or a base station (106).

* * * * *